Patented May 8, 1923.

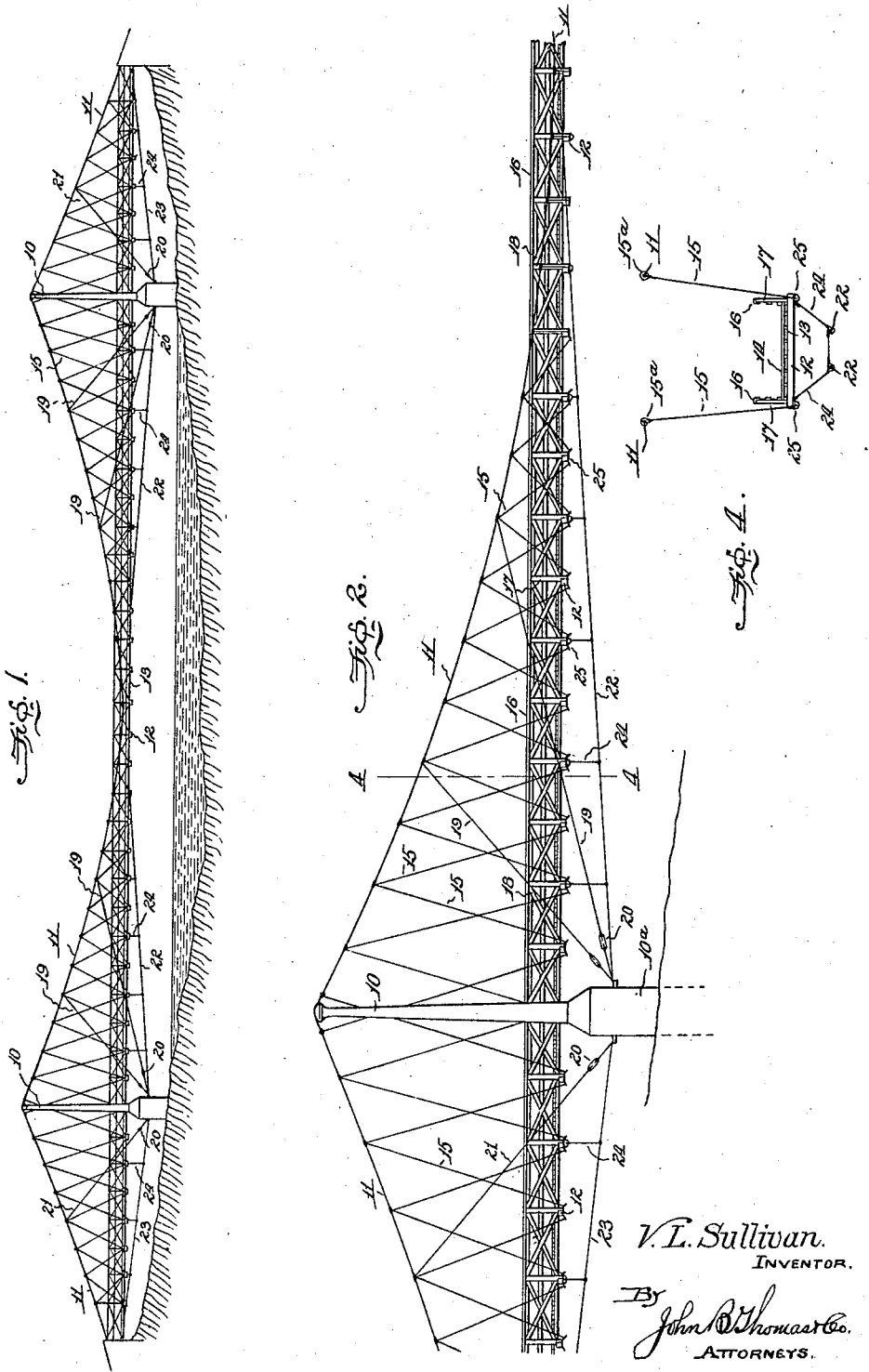

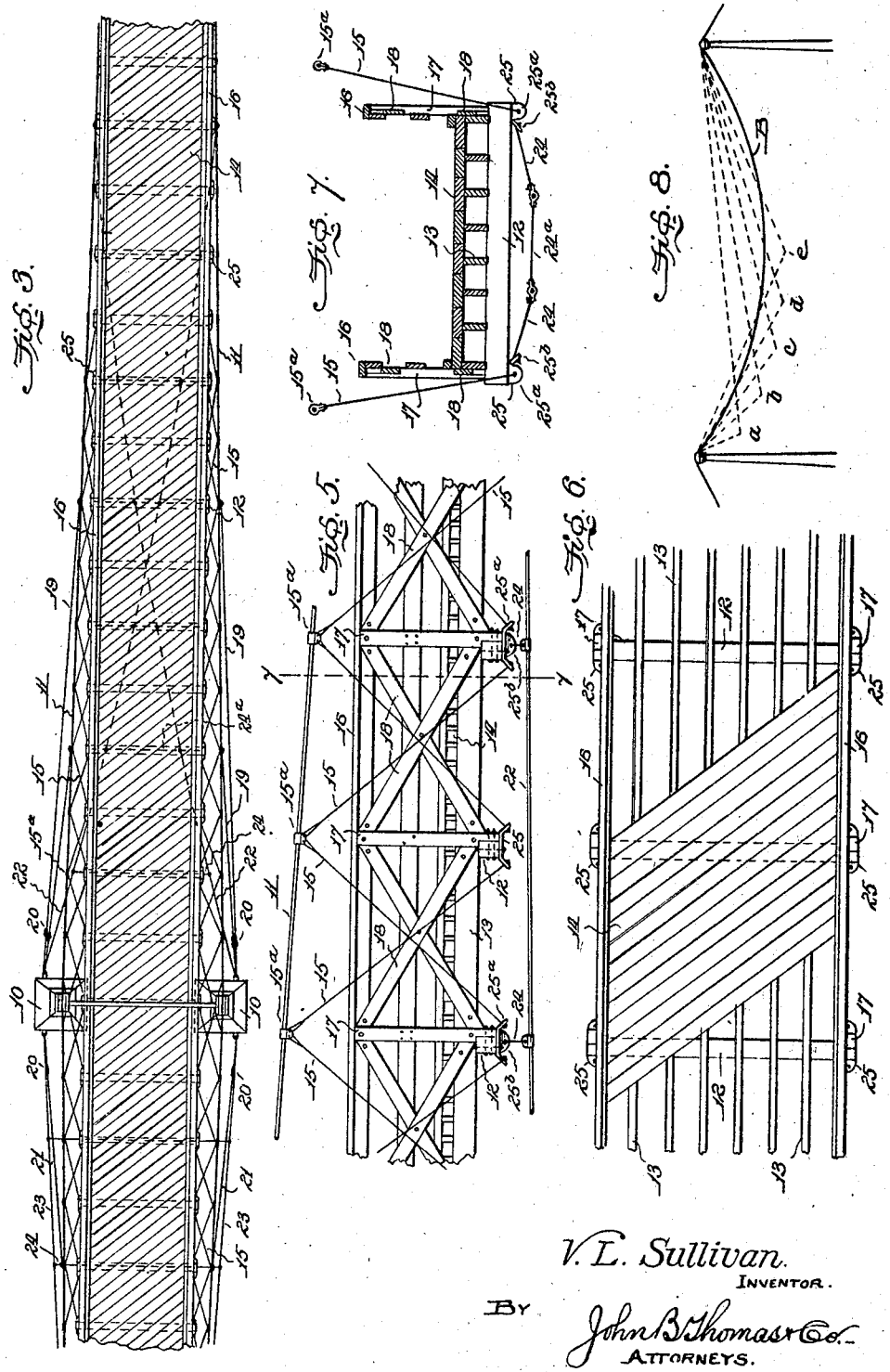

1,454,772

UNITED STATES PATENT OFFICE.

VERNON L. SULLIVAN, OF EL PASO, TEXAS.

SUSPENSION BRIDGE.

Application filed November 1, 1921. Serial No. 512,012.

*To all whom it may concern:*

Be it known that I, VERNON L. SULLIVAN, a citizen of the United States, residing at El Paso, in the county of El Paso and State of Texas, have invented Improvements in Suspension Bridges, of which the following is a specification.

My invention is an improvement in the construction of bridges, and relates more especially to suspension bridges in which the floor for the traffic is suspended by rods from supporting cables extending over towers with their ends anchored at or beyond the approaches to the bridge, the cables describing an arc in the span between the towers and from the towers to the anchors.

In the use of a suspension bridge of the ordinary type the floor over which the traffic passes is subjected to an undulating or wave motion that varies with respect to the main span as the load approaches the center of said span—the point of greatest undulation or sag being nearer the towers which support the cables and gradually decreasing to the center at which latter point there is the minimum undulation or sag—and this variation is caused by the deflection of the cables in both directions from the location of the load moving over the bridge, inasmuch as that portion of each cable extending from the location of the load to the nearer tower assumes with the other or longer portion of the cable an obtuse angle of lesser degree than when the load is at the center of the span where the pull is equalized; in other words, the sag in the supporting cables from a true arc becomes more evenly divided as the load approaches the center of the span from either tower. In the construction of bridges of this type it is customary to so arrange the supporting cables as to provide for a maximum sag, consistent with the required strength, for said cables will then sustain a greater load than if the radii arc is larger.

Bridges of this character are also subjected to a lateral or swaying motion, as well as a lifting motion, under stress of wind, and of course the undulating, swaying, and lifting motions are not only objectionable to those using the bridge but the effect on the structure has a tendency to gradually weaken the same.

With these objections to the ordinary suspension bridge in mind it is the purpose of my invention to so improve the general construction of this special type of bridge as to make it practically anti-undulating for the more convenient passage of vehicles and other traffic thereover, and also provide against swaying or lifting of the main span under the pressure of high winds.

My invention therefore consists in the particular construction of a suspension bridge whereby in one instance I provide in connection with the usual main cables, suspension rods and floor structure what I term anti-undulating cables which are fastened to and extend from the base portion or pier of each tower and are connected at their outer ends to the main cables, the number of anti-undulating cables and distance of their connection to the main cables away from the towers depending upon the length of the bridge structure, and in connection therewith provide anti-sway cables which are likewise attached to the piers of the towers and are arranged with respect to the main cables and floor structure, to which latter they are also connected, whereby the spans of the bridge will more effectually withstand wind pressure; all as hereinafter fully described and more particularly set forth in the appended claims.

In the accompanying drawings:

Fig. 1 is a side elevation of a suspension bridge constructed in accordance with my invention.

Fig. 2 is a similar view on a larger scale of a portion only of the bridge to more clearly show certain features of the present construction.

Fig. 3 is a plan view of Fig. 2.

Fig. 4 is a sectional view on line 4—4 of Fig. 2.

Figs. 5 and 6 are detail views in side elevation and plan, respectively, to more clearly illustrate the floor structure including the side rails and truss rods for bracing the same.

Fig. 7 is a sectional view on line 7—7 of Fig. 5.

Fig. 8 is a diagrammatic view to illustrate the sag or undulations which occur in the ordinary form of suspension bridge.

In carrying out my invention I employ the usual towers 10, 10, and main supporting cables 11, 11, the latter passing over the tops of the towers in the usual manner and are suitably anchored in the ground at their ends. The height of the towers with respect to the approaches to the main span and length of the latter will determine the arc of the main cables in the span between the towers, and in the present instance the conventional arrangement in this regard may be provided. I also employ the conventional form of floor structure for the traffic, in which there are cross-beams 12 for the floor-joists 13 on which the planking 14 is nailed; and in the present instance the rods, as 15, by which the aforesaid floor beams are suspended from the main cables 11 are preferably disposed so as to distribute the load on said cables, for which purpose each floor-beam 12 is suspended at each end by two rods, 15, 15, that diverge from the beam to widely separated points on the cable above. This arrangement of the floor suspension rods is of advantage in distributing the weight of the load passing directly over any one of the beams to different points on the main cables, instead of points immediately above, thus not only relieving said cables by distribution of the load but also tending to minimize undulations in the span of the bridge.

The bridge is provided at each side of the floor with the usual hand-rails 16 supported by posts 17 rising from the floor-beams 12, to which latter they are securely fastened, and this structural part of the bridge is thoroughly braced by diagonal strips 18, extending from the top of each post to the beam supporting the next post in both directions. This arrangement of the bracing strips stiffens the floor structure and in connection with the aforementioned disposition of the suspension rods serve to distribute the weight of the load passing over the bridge. As will be understood the floor of the bridge is supported on a line immediately above the piers from the main cables which pass over the upper ends of the towers rising from said piers, the towers being located at opposite sides of the bridge structure, and that the parts hereinbefore described comprise the main structure of a suspension bridge, in the present instance providing for lightness and stability.

As a part of the construction of the suspension bridge, for the purpose of minimizing, if not entirely eliminating, the undulating or wave motion to which the floor is subjected during the passage of a vehicle or other load over the same I provide a series of cables, 19, which are securely fastened at their inner ends to the piers of the towers and extend in both directions therefrom for connections directly to the main cables 11 at a suitable distance from said towers, and these cables, 19, I have termed "anti-undulating cables," each being provided with a turn-buckle 20 for quickly and positively truing up said cables to properly distribute the load passing over the bridge. As will be noted by reference to the drawings I provide two anti-undulating cables extending from each tower or pier at opposite sides of the bridge to the main cables towards the center of the main span, connecting said anti-undulating cables to different points of the main cables at suitable distances from the towers, and also provide an anti-undulating cable 21 for each short or shore span of the bridge which extends from the pier to the cable, at each side of the bridge, being connected to the main cable about midway its length from tower to anchor. These anti-undulating cables act to stabilize or reinforce the main supporting cables to prevent undulating motion of the bridge, as hereinafter more fully explained.

In connection with the anti-undulating cables I provide the bridge structure with cables adapted to serve the purpose of preventing a swaying or lifting motion of the bridge spans during high winds, those, as 22, used in conjunction with the main span extending from the piers at each end of said span to the center of the cables, being preferably crossed under the floor of the bridge as shown in the drawings, similar cables, as 23, extending from the piers to the ends of the shorter spans and likewise crossed under the floor, and to reinforce these anti-sway cables or increase their effectiveness in operation they are connected at intervals by rods 24 to the ends of the floor beams 12 and by rods 24ª to each other, a suitable number of tie-rods being used as required.

It will be noted that both the anti-undulating cables and cables preventing swaying motion are fastened directly to the piers of the towers at a distance below the plane of the floor of the bridge to exert the proper tension on the main cables to counteract the effect of a load as it passes over the bridge from one end to the other, and that they cooperate to increase the stability of the bridge.

By reference to the diagrammatic view, Fig. 8 of the drawings, showing the maximum sag from a true arc on the unrestricted cables of an ordinary suspension bridge, it will be noted that, in respect to the main span, as the load leaves a tower and approaches the center of the span it will, at the point $a$ sag or deflect the cable B so that it will assume an obtuse angle of much lesser degree than when it arrives at the center of the span or point $e$, the angle of deflection becoming greater from point $a$ to point $e$, as indicated at $b$, $c$, $d$; the undulation or sag in the cables being therefore greater at the point $a$ and diminishing to the center of the span or point $e$. By providing the anti-undulating cables and connecting them in substantially the manner shown and described the main cables are reinforced in such manner that the usual undulations or wave motions on the floor of the bridge are eliminated, the operation of these anti-undulating cables being further augmented by the disposition of the suspension rods and truss-rods of the main bridge structure. For the purpose of explanation we will assume that a load passing over the bridge arrives at the center of the first or short span, the anti-undulating cables in the main span and other short span, in connection with the corresponding anti-sway cables will prevent sagging of the floor, for the reason that the main cables are held at the true arc at other points than where the load is located. likewise the main supporting cables will be held at the true arc as the load passes along the main span between the towers, in each instance the only anti-undulating cable not actually in play to hold the cables to the true arc being those connected to the cables at the points above the load.

The disposition of the anti-sway cables are such that they reinforce the bridge against lateral movement, and also against a lifting motion, to which ordinary suspension bridges are subjected by wind pressure, the crossing of these cables under the floor, and connecting them to the floor beams increasing their effectiveness.

By the use of the anti-undulating cables a greater deflection or more sag may be used in the construction of the main cables permitting the use of lighter cables without weakening the bridge, and by reducing the undulating action, or entirely eliminating such action, with the improved bridge construction herein shown and described the bridge will not only provide a more pleasant passageway for traffic but will be safer, as well as more durable and consequently last a longer period of time notwithstanding its lighter construction.

To provide for connecting the supporting-rods 15 to the main cables and floor-beams, respectively, an ordinary metal clamp 15<sup>a</sup> is used on the cables 11, and to the underside of each end of the beam 12 is bolted a bracket-plate 25 having opposite ears 25<sup>a</sup> pierced to receive said rods (see Figs. 5 and 6); the brackets at the ends of some of the floor-beams being also provided each with an additional apertured ear, 25<sup>b</sup>, for connecting thereto the truss rods 24 used in connection with the anti-sway cables.

I claim:—

1. In a suspension bridge the combination with the bridge structure comprising towers, supporting cables extending between and over the towers to suitable anchors, and a floor structure including cross-beams suspended from said cables, of anti-sway cables fastened to the lower portions of the towers and extending across the underside of the floor of the main span to the center of the cables at opposite sides of the bridge, respectively, and rods connecting said anti-sway cables to the beams of the floor structure.

2. In a suspension bridge the combination with the bridge structure comprising towers, supporting cables extending between and over the towers to suitable anchors, and a floor structure including cross-beams suspended from said cables, of anti-sway cables fastened to the lower portions of the towers and extending in opposite directions from the towers across the underside of the floor of the main span and short spans and attached to the center of the main cables between the towers and to the abutments of the bridge, and vertical rods connecting said anti-sway cables to the beams of the floor structure, substantially as shown and for the purpose set forth.

3. In a suspension bridge the combination with the bridge structure comprising towers, supporting cables extending between and over the towers to suitable anchors, and a floor structure including cross-beams suspended from said cables, of anti-undulating cables fastened to and extending from the lower portions of the towers and connected at their outer ends to the main cables at different distances from said towers, a plurality of said cables being so connected to each portion of the main cable between the towers and center of the main span, a set of anti-sway cables also fastened to the lower portions of the towers and extending across beneath the floor of the bridge to the center of the main cables at opposite sides of the bridge, respectively, and rods connecting the last mentioned cables to the beams of the floor structure at different points, substantially as shown and for the purpose set forth.

4. In a suspension bridge the combination with the bridge structure comprising towers and supporting cables extending between and over the towers to suitable anchors, of cross-beams upon which the floor of the bridge is supported, a pair of rods connected to an end of each floor-beam and diverging therefrom to the main cable above which they are connected at widely separated points, anti-undulating cables fastened to the lower portions of the towers and extending therefrom in opposite directions and connected to the main cables, a plurality of said cables being so connected to each portion of the main cable between the tower and center of the main span, anti-sway cables also connected to the lower portions of the towers and crossed beneath the floor and connected at their outer ends to the center of the cables at opposite sides of the bridge, respectively, vertical rods connecting the last mentioned cables to the floor-beams and tie-rods connecting said cables together, substantially as shown and described.

5. In a suspension bridge the combination with the bridge structure comprising towers and supporting cables extending between and over the towers to suitable anchors, of a floor structure comprising cross-beams upon which the floor-joists and planking are supported, rods connected to the ends of each floor-beam and diverging in the longitudinal line of the bridge for connection with the main cables, posts rising from the ends of the beams to carry the hand-rails, and bracing strips crossed between the posts and therefore extending from the ends of the beams in opposite directions to the upper ends of the posts; together with anti-undulating cables fastened to the lower portions of the towers and extending in opposite directions therefrom and connected to the main supporting cables, a plurality of said cables being so connected to each portion of the main cables between the tower and center of the main span, anti-sway cables crossed beneath the floor of the bridge and connected to the center of the main cables at opposite sides of said bridge, vertical rods connected to the last mentioned cables and to the floor-beams, at different intermediate points, and tie-rods connecting said cables together, substantially as shown and for the purposes set forth.

VERNON L. SULLIVAN.